J. H. HAMMER.
PIN RETAINER.
APPLICATION FILED SEPT. 19, 1914.
1,145,193.
Patented July 6, 1915.
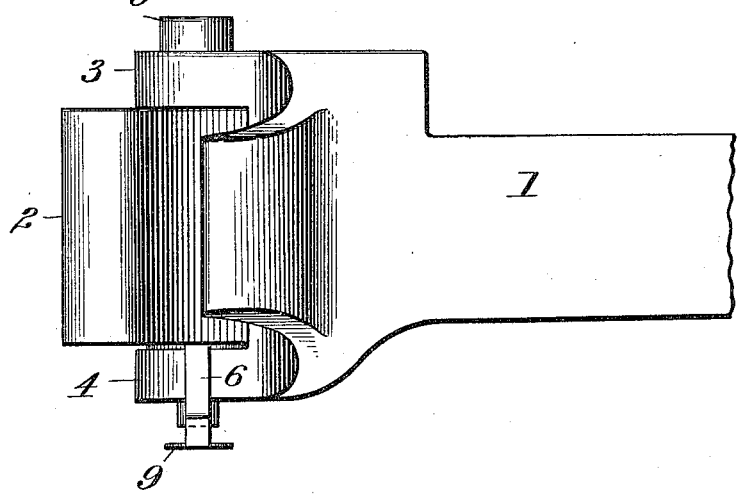
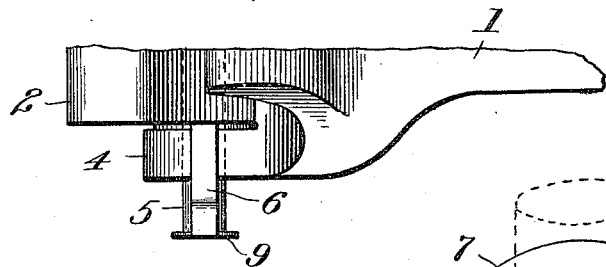
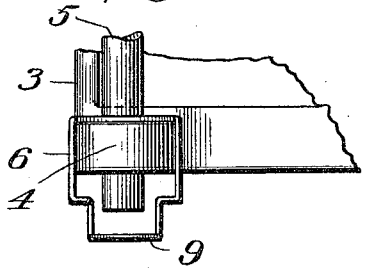
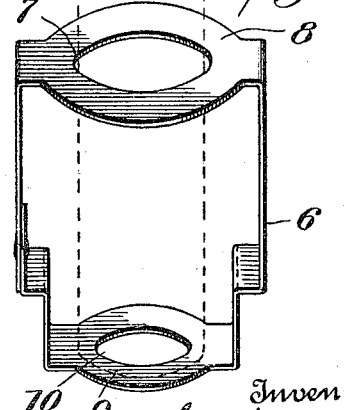
Witnesses
Robert Watson
C. M. Walter
Inventor
Joseph H. Hammer
By C. W. Clement
Attorney

UNITED STATES PATENT OFFICE.

JOSEPH H. HAMMER, OF SUNBURY, PENNSYLVANIA.

PIN-RETAINER.

1,145,193.      Specification of Letters Patent.      Patented July 6, 1915.

Application filed September 19, 1914. Serial No. 862,540.

*To all whom it may concern:*

Be it known that I, JOSEPH H. HAMMER, a citizen of the United States, residing at Sunbury, in the county of Northumberland and State of Pennsylvania, have invented certain new and useful Improvements in Pin-Retainers, of which the following is a specification.

This invention relates to improvements in an attachment for car couplings, and has for its object the retaining in place the broken part of a knuckle pin or coupling pin that has accidentally been broken, thus preventing the lugs of a coupling from being broken due to overstrain on the same. It is simple in construction, and can be economically manufactured.

The various features of the invention will be hereinafter more fully described in connection with the accompanying drawing, in which:—

Figure 1, is a side elevation of a car coupling with the retaining device attached. Fig. 2, is a side elevation of the lower half of a coupling with the device attached showing broken part of a pin held by retainer. Fig. 3, is a sectional view of a coupling with retainer in place. Fig. 4, is a perspective view of the retainer.

Referring to the drawing, 1 indicates the usual form of coupling supplied with a turning knuckle 2 pivoted to the said coupling between the arms or lugs 3 and 4 by means of pivot pin 5.

6 indicates a retainer which may be stamped or cut out of a thin sheet of metal and bent or formed into the shape shown having the opening 7 in the part 8 large enough to permit a knuckle pin to pass through it and hold the retainer in place. The seat 9 of the retainer which is designed to hold a broken part of knuckle pin, has an opening 10 in the same smaller in diameter than the opening 7 or a knuckle pin which prevents a knuckle pin from falling through, and is so made that a knuckle pin can be readily loosened by inserting any instrument in the bottom of the same.

The retainer may be applied to a coupling by raising the knuckle pin 5 and removing the knuckle 2, and placing the part 8 over the end of the arm or lug 4, the knuckle is then placed in its usual position, the pin 5 lowered through the same and also passing through the opening 7 of the retainer and the lug 4.

The retainer when placed in the position described is out of the way of a workman, and does not interfere in any way with the performance of his duties. It will be readily seen that if part of a knuckle pin is broken off and lost, thus releasing the lower part of a knuckle that all the strain will fall on the upper lug of a coupling and under great strain will break the same, thus putting the coupler out of use. By the use of the retaining device described the strain is equally distributed even if the knuckle pin is broken.

What I claim as new and desire to secure by Letters Patent is:—

1. As an article of manufacture, a retaining yoke for the pivot pins of couplers, said yoke having top and bottom members connected by side members to form a quadrilateral, the top member having an opening adapted to receive a pivot pin, and the bottom member having an opening of less diameter than such pin.

2. The combination with a draw head having upper and lower lugs, a knuckle located between said lugs, and a pivot pin extending through said lugs and knuckle, of a retaining yoke having a top member, a pair of side members connected therewith, and a bottom member suspended by said side members, to form a stirrup, said top member resting upon the upper surface of said lower lug, and provided with an opening through which said pin passes, and said bottom member being disposed underneath the pin and adapted to support the same in case of breakage.

In testimony whereof I affix my signature in presence of two witnesses.

JOSEPH H. HAMMER.

Witnesses:
     JOSEPH TAYLOR,
     C. W. CLEMENT.

Copies of this patent may be obtained for five cents each, by addressing the "Commissioner of Patents, Washington, D. C."